Patented Dec. 7, 1926.

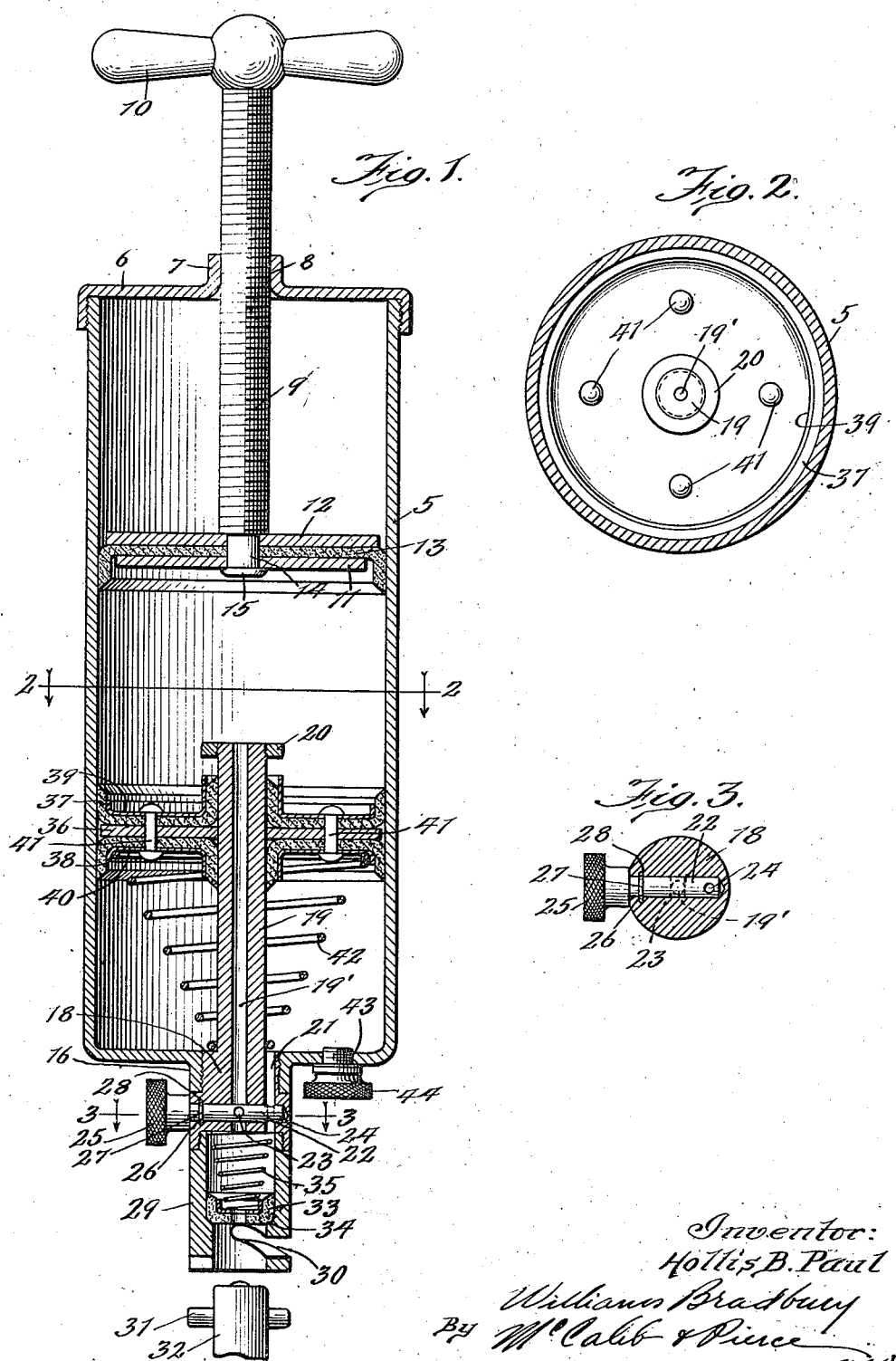

1,609,424

UNITED STATES PATENT OFFICE.

HOLLIS B. PAUL, OF CHICAGO, ILLINOIS, ASSIGNOR TO THE BASSICK MANUFACTURING COMPANY, OF CHICAGO, ILLINOIS, A CORPORATION OF DELAWARE.

LUBRICATING APPARATUS.

Application filed November 30, 1923. Serial No. 677,902.

My invention relates to improvements in lubricating apparatus, and is particularly concerned with, though not limited to, improvements in the so-called high pressure lubricating systems now in common use, and comprising a plurality of fittings, one of which is secured to each of the bearings to be lubricated, and a lubricant compressor comprising means for subjecting the lubricant to high pressure, and other means for successively making sealed contact with the various fittings. Most, if not all, automobiles, tractors, trucks, etc. require oil for some of the bearings and grease for other bearings. To supply the proper lubricant to these bearings, two dispensing devices or compressors have heretofore been necessary.

One of the objects of my invention is to provide a compressor having means for the storage of both oil and grease, and other means arranged so that either oil or grease, as may be desired by the operator, may be supplied to the various bearings.

Another object of my invention is to provide a compressor or dispensing device such as described comprising common means for subjecting both the oil and the grease to pressure.

A still further object of my invention is to provide a compressor or dispensing device such as described in which a common means is used for making sealed contact with the fittings and conducting either oil or grease thereto.

Another object of my invention is to provide a compressor or dispensing device such as described which is simple in construction, economical to manufacture, and easy to operate.

Other objects of my invention will appear as this description progresses, reference being had to the accompanying drawings, in which Figure 1 is a central longitudinal section through a compressor embodying my invention;

Figure 2 is a transverse section taken on line 2—2 of Figure 1, and

Figure 3 is a transverse section taken on line 3—3 of Figure 1.

Referring to the drawings, my improved compressor or dispensing device comprises an elongated barrel 5 having a cap 6 detachably secured to one end, and provided with a nipple 7 forming a centrally located aperture 8 for the reception of the threaded piston rod 9, which is provided at its outer end with a suitable handle 10, and at its inner end with a piston comprising the face plate 11, the follower plate 12 and the cup leather 13, all of which are swiveled upon the reduced end portion 14 of the piston rod and secured thereto by swaging the end of the piston rod, as shown at 15.

The opposite end of the barrel is provided with a discharge nipple 16 which forms an internally threaded opening 17 for the reception of the externally threaded plug 18. This plug has an inwardly extending tubular member or extension 19, the inner end of which is provided with a suitable stop 20 for a purpose about to be described. The plug 18 is also provided with a longitudinally extending duct 21 adapted to communicate with the adjacent end of the barrel.

The valve rod 22 extends transversely of the plug 18, and is provided with two ports 23 and 24 which are arranged at right angles to each other. The first of these ports is adapted to be brought into registry with the bore 19' of the tubular member 19, and the second is adapted to be brought into registry with the duct 21, respectively. I prefer to provide the valve rod 22 with a suitable knurled handle 25 by means of which the valve rod can be rotated. The valve rod is preferably held in place by means of a split ring or torus 26, the inner and outer sides of which engage the annular groove 27 formed in the valve rod 22, and the annular groove 28 formed in the plug 18, respectively.

A sleeve 29 is threaded to the outer end of the plug 18 and provided with an inclined bayonet slot 30 which is adapted to receive the ends of the pin 31 projecting from the sides of the fitting 32. A suitable cup leather 33 is slidably mounted in the inner end of the bore of the sleeve 29, and is yieldingly held against the annular shoulder 34 by means of a spring 35 interposed between it and the outer end of the plug 18. The construction of the coupling member just described, and the manner in which it co-acts with the fitting 32, are well known to those skilled in this art, and further description thereof appears to be unnecessary.

Slidably mounted upon the tubular member or extension 19 is an annular piston comprising the follower plate 36, the cup leathers 37 and 38, and the face plates 39 and 40, all of which are secured together by means of rivets 41, or in any other suitable manner. A spiral spring 42, interposed between the piston just described and the plug 18, tends to urge this piston toward the inner end of the tubular member 19. The inward movement of the piston is limited by the stop 20.

The end of the compressor opposite the cap 6 is provided with a filling opening 43 which may be closed by a suitable plug 44.

In operation, the knurled handle 25 is turned so as to position the valve rod 22 in such manner as to turn the port 24 at right angles to the duct 21. The plug 44 is then removed and the chamber between the piston, which travels upon the tubular extension 19 and between the adjacent end of the barrel, is filled with oil. The plug 44 is then replaced. The operator then removes the cap 6 and along with it the piston rod 9 and the piston attached thereto, and substantially fills the remaining part of the barrel. The cap 6 with the piston rod 9 and attached piston are then replaced. If it is desired to supply lubricant to a fitting 32, which is adapted to receive oil, the compressor is attached to this fitting, the valve rod 22 is turned to the position shown in Figure 1, and the operator thereupon turns the piston rod 9 by means of the handle 10 in the proper direction to exert pressure upon the grease contained between the two pistons. This pressure is transmitted to the piston which slides upon the tubular member 19, and compresses the spring 42 while at the same time discharging oil through the duct 21, the gasket 33, and into the fitting 32.

If, subsequently, the operator desires to supply grease instead of oil to a bearing, the valve rod 22 is positioned to close the duct 21 and establish communication between the portion of the barrel containing grease and the fitting. Thereupon, when the handle 10 is turned in the proper direction to force the grease through the tubular member 19, the port 23 and gasket 33, into the fitting, the valve will prevent a discharge of oil from the barrel but permit a discharge of grease therefrom.

In the above manner the operator can supply either grease or oil to the fittings, as may be desired.

It is desirable to make the space between the cup leather 33 and the plug 18 as small as possible so that there will be as little grease or oil remaining in this space as possible, thereby preventing the mixture of the two lubricants when changing from one to the other.

In lubricating a mechanism by means of my compressor, it is desirable to lubricate first all of the bearings which require one kind of lubricant, and then all of the bearings which require the other kind of lubricant so that there will not be so much chance for the two different lubricants to mix in the space between the cup leather 33 and the plug 18.

If desired, suitable indicia may be used for indicating when the knurled head 25 is turned to the proper positions to deliver the two different lubricants.

Having thus described my invention, what I claim is:

1. A lubricant compressor comprising a barrel having a centrally apertured cap at one end and a discharge opening at the opposite end; a plug threaded into said discharge opening and having an inwardly extending tubular member and also having a longitudinally extending duct communicating with the interior of said barrel, a valve rod extending transversely of said plug and having two ports therein at right angles to each other, one of said ports being adapted to be brought into registry with the bore of said tubular member, and the other of said ports being adapted to be brought into registry with said duct, means on the outer end of said valve rod whereby said valve rod can be turned, a coupling member secured to the outer end of said plug and provided with means for making sealed connection with a fitting, an annular piston surrounding said tubular member and reciprocable in said barrel, a spring confined between said piston and said plug for urging said piston toward the inner end of said tubular member, and a piston rod extending through the central aperture in said cap, said piston rod having a piston at its inner end.

2. A lubricant compressor comprising a barrel having an apertured cap at one end and a discharge opening at the opposite end, a plug secured in said discharge opening and having an inwardly extending tubular member and also having a longitudinally extending duct communicating with the interior of said barrel, a valve rod extending transversely of said plug and having two ports therein, one of said ports being adapted to be brought into registry with the bore of said tubular member, and the other of said ports being adapted to be brought into registry with said duct, means on the outer end of said valve rod whereby said valve rod can be moved to bring said ports into registry with said bore and said duct respectively, a coupling member secured to the outer end of said plug and provided with means for making sealed connection with a fitting, an annular piston surrounding said tubular member and reciprocable in said barrel, a spring for urging said piston toward the inner end of said tubular member, and a piston rod extending through the central aperture in said cap, said piston rod having a piston at its inner end.

3. A lubricant compressor comprising a barrel having a cap at one end and a discharge opening at the opposite end, a plug secured in said discharge opening and having an inwardly extending tubular member and also having a longitudinally extending duct communicating with the interior of said barrel, a valve rod having two ports therein, one of said ports being adapted to be brought into registry with the bore of said tubular member, and the other of said ports being adapted to be brought into registry with said duct, means whereby said valve rod can be actuated, a coupling member secured to the outer end of said plug and provided with means for making sealed connection with a fitting, an annular piston surrounding said tubular member and reciprocable in said barrel, and a piston rod extending through the central aperture in said cap, said piston rod having a piston at its inner end.

4. A lubricant compressor comprising a barrel having a discharge opening at one end, a plug secured in said discharge opening and having an inwardly extending tubular member and also having a longitudinally extending duct communicating with the interior of said barrel, means for controlling the passage of lubricant through said tubular member and said duct, a coupling member secured to the outer end of said plug and provided with means for making a sealed connection with a fitting, an annular piston surrounding said tubular member and reciprocable in said barrel, and a piston rod extending through the opposite end of said barrel, said piston rod having a piston at its inner end.

5. A lubricant compressor comprising a barrel, a movable partition in said barrel dividing said barrel into two chambers, common means for subjecting the contents of both chambers to pressure, a common discharge passageway for both chambers, means for controlling the passage of lubricant from said chambers to said common passageway, and means for establishing sealed connection between said common passageway and a fitting.

6. A lubricant compressor comprising a barrel divided into two chambers, common means for subjecting both of said chambers to pressure, and common means for effecting sealed connection between said chambers and a fitting to be supplied with lubricant.

7. A lubricant compressor comprising two chambers, common means for subjecting the contents of both chambers to pressure, means common to both of said chambers for effecting sealed connection with a fitting, and means for controlling the discharge of lubricant from said chambers.

8. A lubricant compressor comprising a barrel having a threaded piston rod projecting through one end thereof, a piston carried by the inner end of said piston rod, a tube extending inwardly from the opposite end of said barrel, an annular piston surrounding said tube, a spring for urging said piston toward the inner end of said tube, and a coupling member communicating with said tube for effecting sealed connection with a lubricant receptacle.

In witness whereof, I hereunto subscribe my name this 22 day of November, 1923.

HOLLIS B. PAUL.